(12) United States Patent
Takeuchi et al.

(10) Patent No.: US 6,871,506 B2
(45) Date of Patent: Mar. 29, 2005

(54) EJECTOR CYCLE

(75) Inventors: Hirotsugu Takeuchi, Nagoya (JP); Haruyuki Nishijima, Nagoya (JP); Syuichi Mizuno, Kariya (JP)

(73) Assignee: DENSO Corporation, Kariya (JP)

( * ) Notice: Subject to any disclaimer, the term of this patent is extended or adjusted under 35 U.S.C. 154(b) by 10 days.

(21) Appl. No.: 10/617,207

(22) Filed: Jul. 10, 2003

(65) Prior Publication Data

US 2004/0007014 A1 Jan. 15, 2004

(30) Foreign Application Priority Data

Jul. 11, 2002 (JP) ......................................... 2002-202724

(51) Int. Cl.$^7$ .............................. F25B 19/02; F25B 1/06
(52) U.S. Cl. ............................................... 62/170; 62/500
(58) Field of Search ........................ 62/500, 191, 170, 62/512

(56) References Cited

U.S. PATENT DOCUMENTS

| | | | | |
|---|---|---|---|---|
| 3,701,264 A | * | 10/1972 | Newton ....................... | 62/191 |
| 5,706,665 A | * | 1/1998 | Gregory ....................... | 62/174 |
| 6,370,889 B2 | * | 4/2002 | Okazaki et al. ............... | 62/119 |
| 6,477,857 B2 | * | 11/2002 | Takeuchi et al. .............. | 62/500 |
| 6,729,149 B2 | * | 5/2004 | Takeuchi ...................... | 62/191 |
| 6,729,158 B2 | * | 5/2004 | Sakai et al. ................... | 62/500 |

FOREIGN PATENT DOCUMENTS

| | | |
|---|---|---|
| JP | 5-26522 | 2/1993 |
| JP | 5-149652 | 6/1993 |

* cited by examiner

*Primary Examiner*—William C. Doerrler
(74) *Attorney, Agent, or Firm*—Harness, Dickey & Pierce, PLC

(57) ABSTRACT

In an ejector cycle with an ejector including a nozzle for decompressing refrigerant, a variable throttle is disposed upstream from the nozzle of the ejector to decompress and expand high-pressure refrigerant flowing from a radiator. For example, the variable throttle decompresses and expands the high-pressure refrigerant in a gas-liquid two-phase state at an upstream position from the nozzle of the ejector. The variable throttle controls a throttle opening degree so that a refrigerant super-heating degree at a refrigerant outlet side of an evaporator or at a refrigerant suction side of a compressor becomes in a predetermined range. Accordingly, the ejector cycle has an improved nozzle efficiency and an improved ejector efficiency in a wide load variation range of the ejector cycle.

20 Claims, 5 Drawing Sheets ic EJECTOR CYCLE

CROSS-REFERENCE TO RELATED APPLICATION

This application is related to and claims priority from Japanese Patent Application No. 2002-202724 filed on Jul. 11, 2002, the contents of which are hereby incorporated by reference.

BACKGROUND OF THE INVENTION

1. Field of the Invention

The present invention relates to an ejector cycle including an ejector. In the ejector cycle, a variable throttle is disposed upstream from a nozzle of the ejector, so that high-pressure refrigerant is decompressed in the variable throttle, before being decompressed in the nozzle.

2. Description of Related Art

In an ejector cycle, refrigerant is decompressed and expanded in a nozzle of an ejector so that gas refrigerant evaporated in an evaporator is sucked, and pressure of refrigerant to be sucked into a compressor is increased by converting expansion energy to pressure energy. In the nozzle of the ejector, the pressure energy of the refrigerant is converted to the speed energy thereof. Further, because refrigerant passing through the nozzle is decompressed to stride over the saturation liquid line, refrigerant boils near an inner wall surface defining a throttle portion of the nozzle. On the other hand, in a center portion separated from the inner wall surface, because refrigerant is difficult to boil, liquid drops of refrigerant are difficult to become minute. Therefore, nozzle efficiency and ejector efficiency may be decreased in the ejector cycle.

To overcome this problem, in JP-A-5-149652, a fixed throttle is disposed upstream from a nozzle in an ejector, so that refrigerant is decompressed by the fixed throttle and the nozzle in two steps. That is, refrigerant boils once in the fixed throttle at the first step, and the refrigerant is expanded at an inlet of the nozzle so as to boils in the nozzle at the second step while generating a bubble core. In the ejector, because the first throttle is the fixed throttle, a flow amount cannot be adjusted. Therefore, the nozzle efficiency and the ejector efficiency of the ejector cycle cannot be improved in a wide load variation area.

SUMMARY OF THE INVENTION

In view of the foregoing problems, it is an object of the present invention to provide an ejector cycle having an ejector, which effectively improves an ejector efficiency and a nozzle efficiency in a wide load variation area of the ejector cycle.

According to an ejector cycle of the present invention, an ejector includes a nozzle for decompressing and expanding refrigerant flowing from a high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant injected from the nozzle and refrigerant sucked from a low-pressure heat exchanger. Further, a gas-liquid separator for separating refrigerant from the ejector into gas refrigerant and liquid refrigerant, includes a gas refrigerant outlet coupled to a refrigerant suction side of a compressor, and a liquid refrigerant outlet coupled to a refrigerant inlet side of the low-pressure heat exchanger. In the ejector cycle, a variable throttle is disposed in a refrigerant passage between a high-pressure heat exchanger and the ejector, and the variable throttle has a throttle opening degree that is variable such that a refrigerant super-heating degree at a refrigerant outlet side of the low-pressure heat exchanger or at a refrigerant suction side of the compressor becomes in a predetermined range. Therefore, it is possible to suitably decompress refrigerant before being introduced into the nozzle of the ejector. Accordingly, ejector efficiency and nozzle efficiency can be effectively improved while a sufficient cooling capacity can be obtained in the ejector cycle, in a wide load vibration area of the ejector cycle.

Preferably, the variable throttle is disposed to decompress high-pressure refrigerant from the high-pressure heat exchanger, to a gas-liquid two-phase state. Therefore, the nozzle efficiency and the ejector efficiency can be effectively improved in the wide load vibration area of the ejector cycle.

For example, the variable throttle is a mechanical expansion valve that mechanically operates based on the refrigerant super-heating degree sensed by a sensing portion. Alternatively, the variable throttle is an electrical throttle that is electrically operated based on the refrigerant super-heating degree detected by a sensor. Accordingly, the throttle opening degree of the variable throttle can be accurately controlled based on the super-heating degree.

Preferably, at least a part of the variable throttle is integrated with the ejector. In this case, the structure of the ejector cycle can be made simple, and the size of the ejector cycle can be reduced.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

First Embodiment

Figure 1:
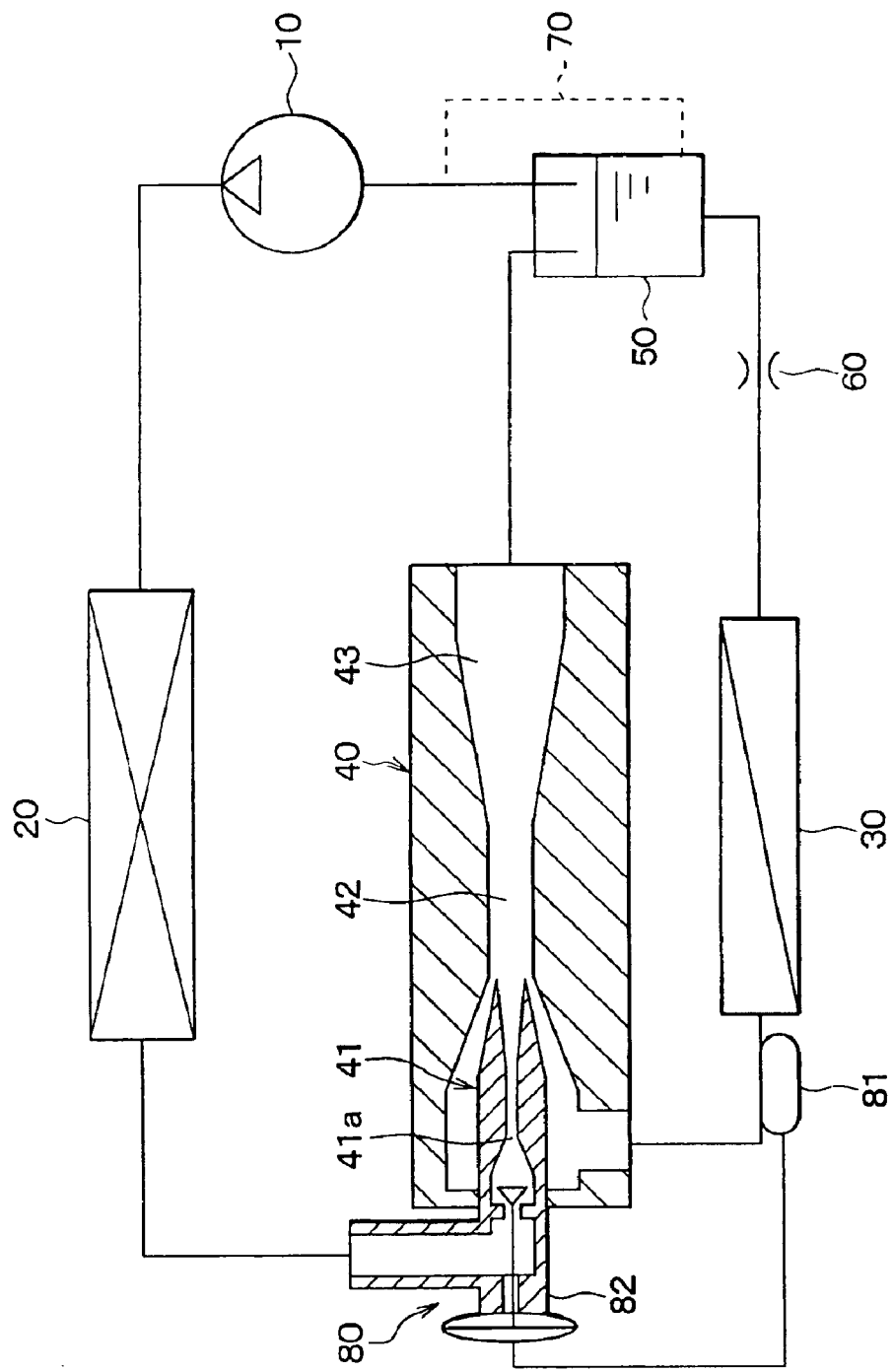
FIG. 1 is a schematic diagram showing an ejector cycle according to a first preferred embodiment of the present invention.

In the first embodiment, an ejector cycle is typically used for a vapor compression refrigerator used for a showcase for refrigerating foods. As shown in FIG. 1, a compressor 10 is an electric compressor for sucking and compressing refrigerant circulated in the ejector cycle. A radiator 20 is a high-pressure heat exchanger for cooling high-temperature and high-pressure refrigerant discharged from the compressor 10 by performing heat-exchange operation between outside air and the high-temperature and high-pressure refrigerant. Further, an evaporator 30 is a low-pressure heat exchanger for cooling air to be blown into the showcase by evaporating liquid refrigerant, more specifically, by performing heat-exchange operation between the air and low-pressure refrigerant. An ejector 40 sucks refrigerant evaporated in the evaporator 30 while decompressing and expanding refrigerant flowing out from the radiator 20 in a nozzle 41, and increases pressure of refrigerant to be sucked into the compressor 10 by converting expansion energy to pressure energy.

The ejector 40 includes the nozzle 41, a mixing portion 42, a diffuser 43 and the like. The nozzle 41 decompresses and expands high-pressure refrigerant flowing into the ejector 40 in iso-enthalpy by converting pressure energy of the high-pressure refrigerant from the radiator 20 to speed energy thereof. The mixing portion 42 sucks refrigerant evaporated in the evaporator 30 by using an entrainment function of high-speed refrigerant stream injected from the nozzle 41, and mixes the sucked refrigerant and the injected refrigerant. Further, the diffuser 43 mixes the refrigerant injected from the nozzle 41 and the refrigerant sucked from the evaporator 30, and increases the refrigerant pressure by converting speed energy of the mixed refrigerant to pressure energy thereof.

In the mixing portion 42, a drive stream of refrigerant from the nozzle 41 and a suction stream of the refrigerant from the evaporator 30 are mixed so that their momentum sum is conserved, thereby increasing refrigerant pressure. In the diffuser 43, because a refrigerant passage sectional area gradually increases toward its outlet, the refrigerant speed energy (dynamic pressure) is converted to refrigerant pressure energy (static pressure). Thus, in the ejector 40, refrigerant pressure is increased by both of the mixing portion 42 and the diffuser 43. Accordingly, in the ejector 40, a pressure-increasing portion is constructed with the mixing portion 42 and the diffuser 43.

In the first embodiment, "Laval nozzle" (refer to Fluid Engineering published by Tokyo University Publication) is adopted as the nozzle 41 to accelerate refrigerant injected from the nozzle 41 equal to or higher than the sound velocity. Here, the Laval nozzle 41 includes a throttle 41*a* having the smallest passage area in its refrigerant passage. However, a nozzle tapered toward its outlet can be used as the nozzle 41.

In FIG. 1, refrigerant is discharged from the ejector 40, and flows into a gas-liquid separator 50. The gas-liquid separator 50 separates the refrigerant from the ejector 40 into gas refrigerant and liquid refrigerant, and stores the separated gas refrigerant and the separated liquid refrigerant therein. The gas-liquid separator 50 includes a gas-refrigerant outlet connected to a suction port of the compressor 10, and a liquid-refrigerant outlet connected to an inlet of the evaporator 30. Accordingly, in the ejector cycle, liquid refrigerant flows into the evaporator 30 while refrigerant from the radiator 20 is decompressed in the nozzle 41 of the ejector 40.

A throttle 60 is disposed for decompressing refrigerant flowing from the gas-liquid separator 50 toward the evaporator 30. An oil return passage 70 is provided in the gas-liquid separator 50, so that lubrication oil separated by the gas-liquid separator 50 is sucked to the compressor 10.

A variable throttle 80 is disposed in a refrigerant passage between the radiator 20 and the ejector 40. The variable throttle 80 is an expansion valve disposed upstream from the nozzle 41 of the ejector, which decompresses high-pressure refrigerant flowing from the radiator 20 to a gas-liquid two-phase state. The variable throttle 80 controls a throttle opening degree so that a super-heating degree of refrigerant at an outlet side of the evaporator 30 becomes in a predetermined range (e.g., 0.1–10 degrees). The variable throttle 80 can have a structure similar to a well-known thermal expansion valve.

Specifically, the variable throttle 80 includes a temperature sensing portion 81 that senses a refrigerant temperature at the refrigerant outlet side of the evaporator 30, and controls the throttle opening degree by a balance between a gas pressure within the temperature sensing portion 81, a pressure in the evaporator 30 and a spring pressure of the variable throttle 80. Accordingly, when the pressure in the evaporator 30, that is, a thermal load in the evaporator 30 becomes larger, the throttle opening degree of the variable throttle 80 becomes larger. Conversely, when the pressure in the evaporator 30, that is, the thermal load in the evaporator 30 becomes lower, the throttle opening degree of the variable throttle 80 becomes smaller.

In the first embodiment, a valve body 82 of the variable throttle 80 is integrated with the ejector 40, so that the size of a decompression portion constructed with the variable throttle 80 and the ejector 40 is reduced.

Next, operational effects of the ejector 40 according to the first embodiment will be now described. As shown in FIG. 1, refrigerant discharged from the compressor 10 circulates toward the radiator 20. Then, high-pressure refrigerant is cooled in the radiator 20 and is decompressed in the variable throttle 80 in iso-enthalpy to a gas-liquid two-phase state. Thereafter, refrigerant from the variable throttle 80 is further decompressed in the nozzle 41 of the ejector 40 in iso-enthalpy, so that the refrigerant speed at the outlet of the nozzle 41 of the ejector becomes equal to or higher than the speed of the sound. Thereafter, refrigerant from the outlet of the nozzle 41 flows into the mixing portion 42 of the ejector 40.

Figure 2A:
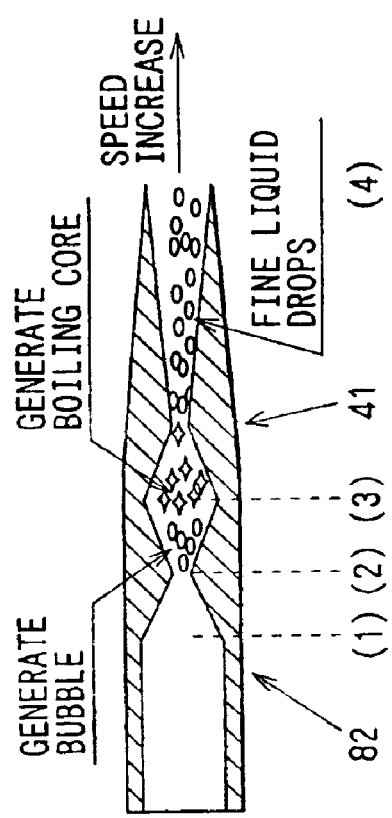
FIG. 2A is a Mollier diagram (p–h diagram) showing decompression operation of a variable throttle and a nozzle of an ejector in the ejector cycle.
Figure 2B:
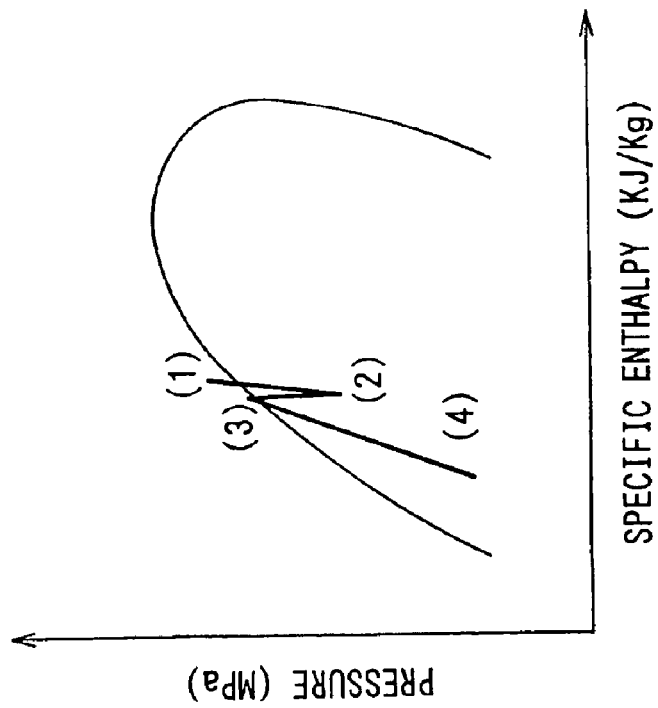
FIG. 2B is an enlarged schematic diagram for explaining the decompression operation in the ejector cycle, according to the first embodiment.
Figure 3:
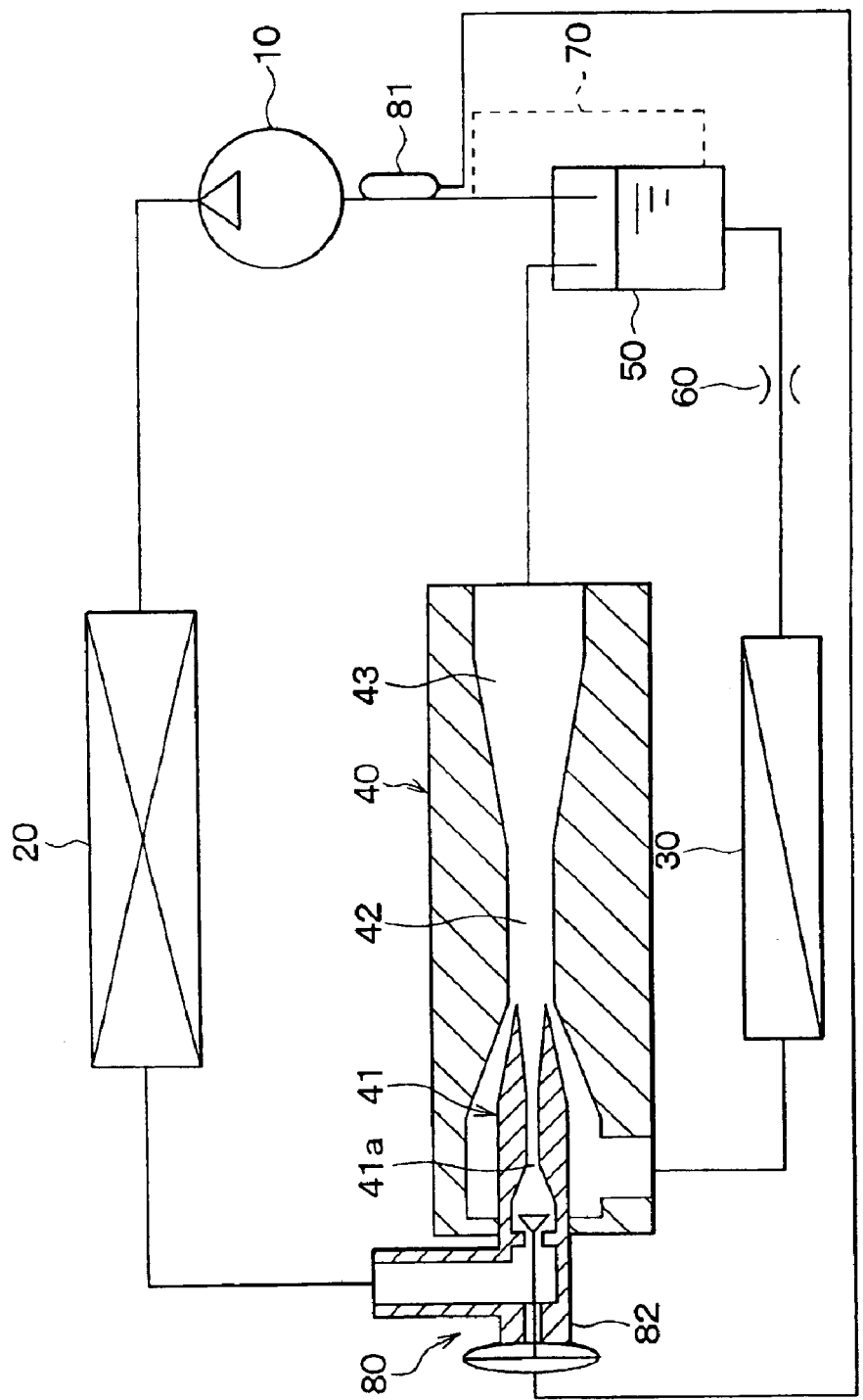
FIG. 3 is a schematic diagram showing an ejector cycle according to a second preferred embodiment of the present invention.

FIGS. 2A and 2B show a refrigerant state by the decompression operation at two steps in the ejector cycle. In FIG. 2B, the valve body 82 of the variable valve 80 and the nozzle 41 of the ejector 40 are simply integrally indicated for explaining the two-step decompression due to the variable valve 80 and the nozzle 41. As shown in FIGS. 2A and 2B, refrigerant flows into the variable throttle 80 as shown by (1) in FIG. 2B, and is decompressed by the variable throttle 80 as shown by (2) in FIG. 2B so as to boils once at an inlet side of the nozzle 41. That is, as shown by (3) in FIG. 2B, bubbles are generated by the variable valve 80, and boiling cores are generated after the bubbles disappear at the inlet side of the nozzle 41. Refrigerant with the boiling cores is further boiled by the nozzle 41, so that fine liquid drops (i.e., minute liquid drops) of refrigerant are generated as shown by (4) in FIG. 2B. Because the boiling of refrigerant is facilitated in the nozzle 41, the generation of minute liquid drops of the refrigerant can be facilitated in the nozzle 41. Accordingly, the nozzle efficiency can be effectively improved.

In the first embodiment, freon is used as the refrigerant so that a refrigerant pressure at the high pressure side is lower than the critical pressure of the refrigerant. Therefore, the refrigerant pressure flowing into the nozzle 41 is lower than the critical pressure of the refrigerant.

The mixing portion 42 sucks refrigerant evaporated in the evaporator 30 by using the entrainment function of high-speed refrigerant stream injected from the nozzle 41, and mixes the sucked refrigerant and the injected refrigerant. Further, the diffuser 43 mixes the refrigerant injected from the nozzle 41 and the refrigerant sucked from the evaporator 30, and increases the refrigerant pressure. Therefore, the ejector efficiency can be improved. Accordingly, low-pressure refrigerant in the gas liquid separator 50 circulates the throttle 60, the evaporator 30 and the pressure increasing portion of the ejector 40, in this order, and returns to the gas-liquid separator 50.

According to the first embodiment of the present invention, the refrigerant is decompressed by the variable valve 80 to the gas-liquid two-phase refrigerant at an upstream side of the throat portion 41a of the nozzle 41. Therefore, it can prevent the refrigerant from being throttled more than a necessary degree while the ejector efficiency can be effectively improved. Further, because the throttle opening degree of the variable valve is controlled based on the thermal load (e.g., the super-heating degree of the refrigerant at the outlet side of the evaporator 30), the ejector efficiency of the ejector cycle can be improved even when the cooling load (air conditioning load) is changed. Thus, the ejector cycle can be used in a wide load variation area, while the ejector efficiency, the nozzle efficiency and the cooling capacity of the ejector cycle are improved.

Second Embodiment

In the above-described first embodiment, the throttle opening degree of the variable throttle 80 is controlled so that the super-heating degree of the refrigerant at the outlet side of the evaporator 30 becomes in the predetermined range. However, in the second embodiment, the throttle opening degree of the variable throttle 80 is controlled so that the super-heating degree of the refrigerant at a refrigerant suction side of the compressor 10 becomes in a predetermined range (e.g., 0.1–30 degrees). That is, the temperature sensing portion 81 is disposed at the refrigerant suction side of the compressor 10, and the throttle opening degree of the variable throttle 81 is controlled so that the super-heating degree at the refrigerant suction side of the compressor 10 becomes in the predetermined range.

In the second embodiment, the other parts are similar to those of the above-described first embodiment, and detail description thereof is omitted. Therefore, the advantages described in the above-first embodiment can be obtained.

Third Embodiment

Figure 4:
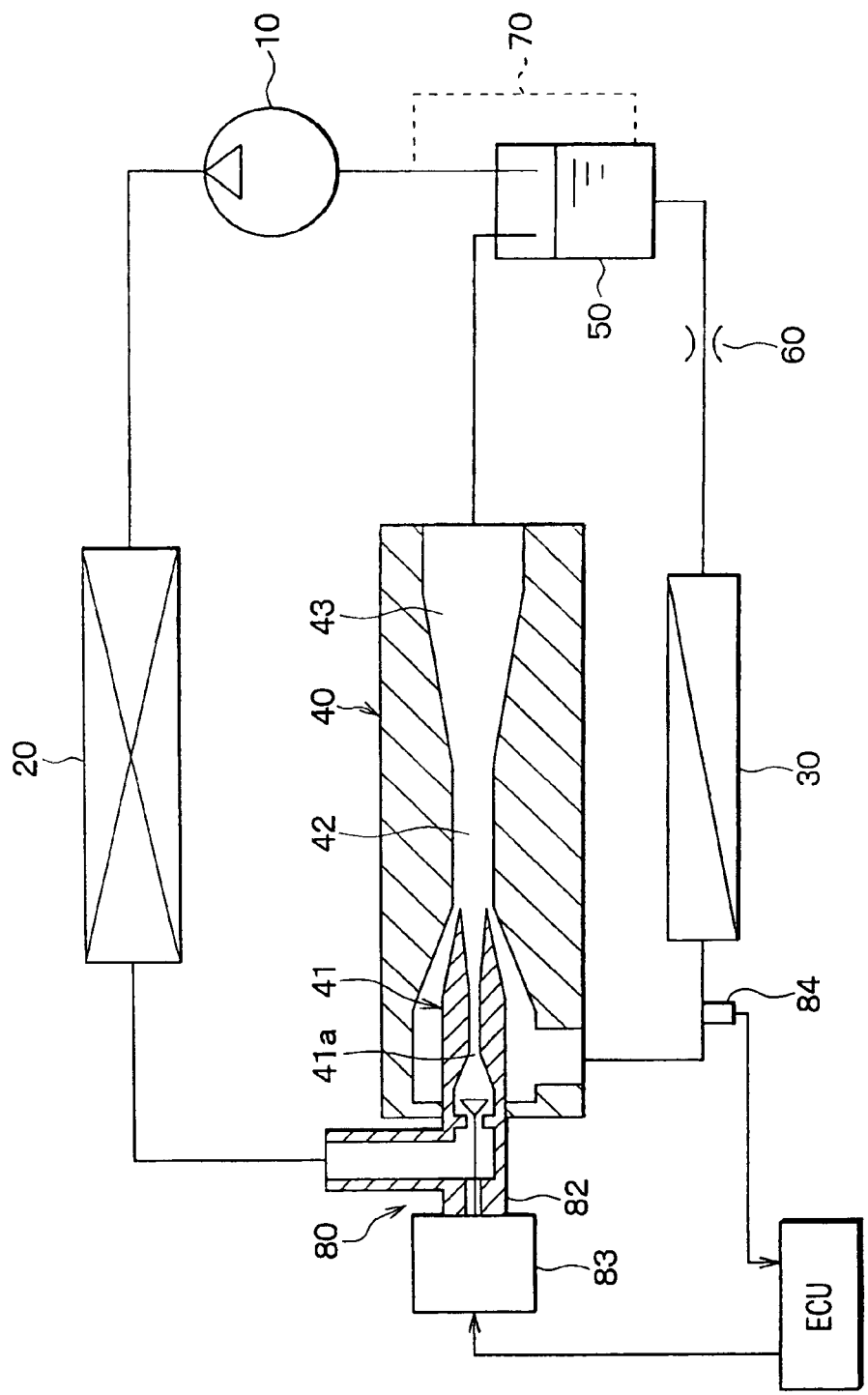
FIG. 4 is a schematic diagram showing an example of an ejector cycle according to a third preferred embodiment of the present invention.
Figure 5:
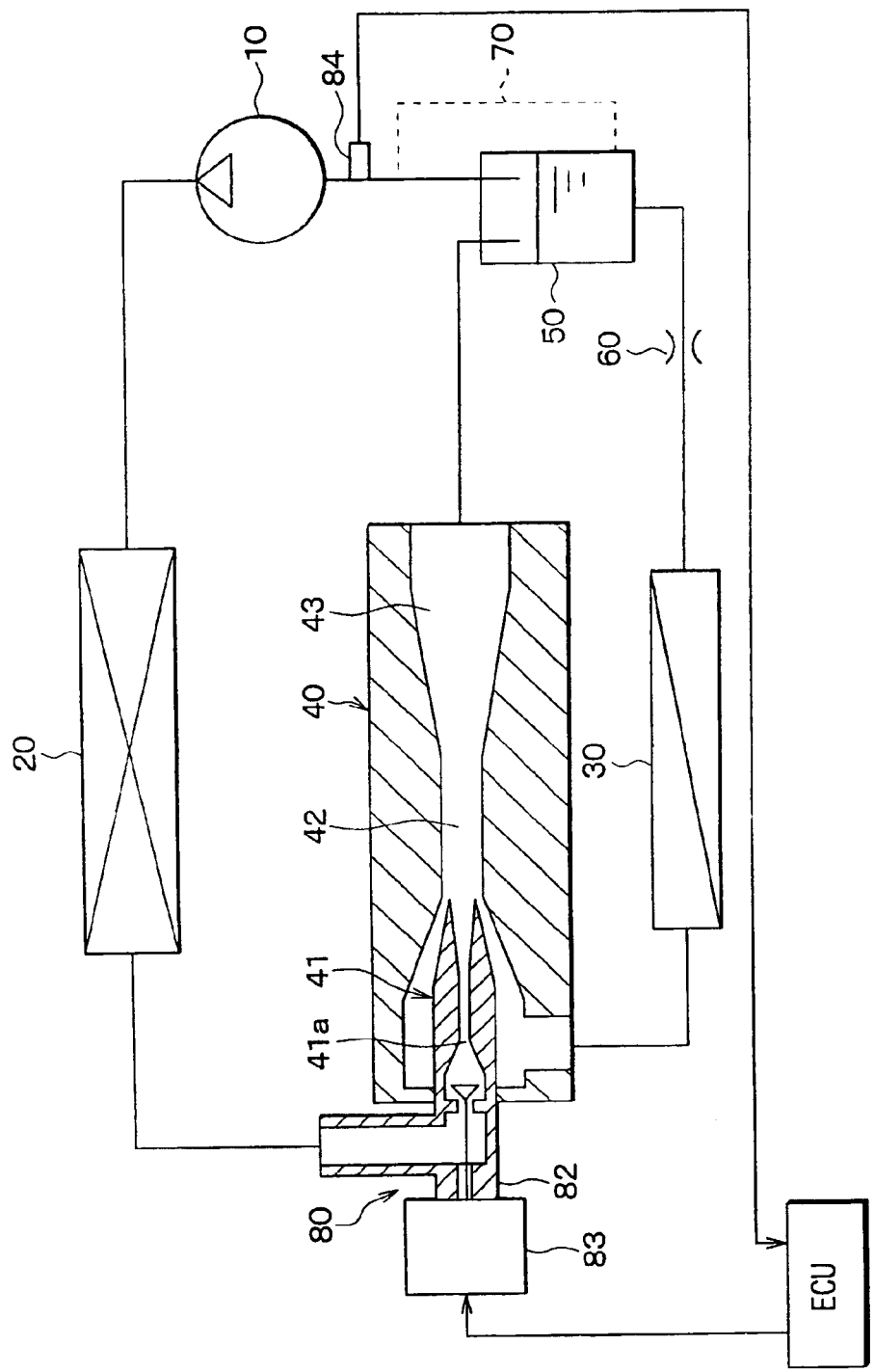
FIG. 5 is a schematic diagram showing another example of the ejector cycle according to the third embodiment.

In the above-described first and second embodiments, the variable throttle 80 is a mechanical variable throttle in which its throttle opening degree is mechanically changed based on the pressure difference and the like. However, in the third embodiment, as shown in FIGS. 4 and 5, an electrical temperature sensor 84 is disposed to detect a refrigerant temperature, and an actuator 83 is controlled by an electronic control unit (ECU) based on the signal from the electrical temperature sensor 84, so that the throttle opening degree of the variable throttle 80 is controlled. In the example of FIG. 4, the electrical temperature sensor 84 is disposed at the refrigerant outlet side of the evaporator 30 to detect the refrigerant temperature (refrigerant super-heating degree) at the refrigerant outlet side of the evaporator 30. Therefore, in this case, the ECU controls the actuator 63 to control the throttle opening degree of the variable throttle 80, so that the super-heating degree at the refrigerant outlet side of the evaporator 30 becomes in a predetermined range. On the other hand, in the example of FIG. 5, the electrical temperature sensor 84 is disposed at the refrigerant suction side of the compressor 10 to detect the refrigerant temperature (refrigerant super-heating degree) at the refrigerant suction side of the compressor 10. Therefore, in this case, the ECU controls the actuator 83 to control the throttle opening degree of the variable throttle 80, so that the super-heating degree at the refrigerant suction side of the compressor 10 becomes in a predetermined range.

In the third embodiment, the other parts are similar to those of the above-described first embodiment, and detail description thereof is omitted. Therefore, the advantages described in the above-first embodiment can be obtained.

Although the present invention has been fully described in connection with the preferred embodiments thereof with reference to the accompanying drawings, it is to be noted that various changes and modifications will become apparent to those skilled in the art.

For example, in the above-described embodiments of the present invention, freon is used as the refrigerant in the ejector cycle. However, the present invention can be applied to an ejector cycle where carbon dioxide is used as the refrigerant. Even in this case, refrigerant is decompressed by two steps due to the variable throttle 80 and the nozzle 41, and the throttle opening degree of the variable throttle 80 can be controlled based on the thermal load at the low-pressure side in the ejector cycle. Further, the present invention can be applied to an ejector cycle where the refrigerant pressure at the high-pressure side is equal to or higher than the critical pressure of the refrigerant.

In the above-described embodiments of the present invention, the ejector cycle is used for the vapor-compression refrigerator for cooling the showcase for refrigerating foods. However, the ejector cycle of the present invention can be used for an air conditioner. Further, in the above-described embodiments, the super-heating degree of the low-pressure refrigerant at the refrigerant outlet side of the evaporator 30 or at the refrigerant suction side of the compressor 10 in the ejector cycle is mechanically or electrically detected from the refrigerant temperature. Generally, the refrigerant temperature is related to the refrigerant pressure. Therefore, the super-heating degree of the low-pressure refrigerant in the ejector cycle can be mechanically or electrically detected from the refrigerant pressure.

Further, in the above-described embodiments, refrigerant is decompressed to the gas-liquid two-phase state by the variable throttle 80, before refrigerant flowing into the throttle portion 41a of the nozzle 41 of the ejector 40. However, the variable throttle 80 is not limited to decompress refrigerant to the gas-liquid two-phase state. That is, the variable throttle 80 can decompress the high-pressure refrigerant from the radiator 20 to a suitable decompression state, before refrigerant flowing into the throttle portion 41a of the nozzle 41. In addition, in the above-described embodiments, the variable throttle 80 can be decompressed in iso-entropy.

Such changes and modifications are to be understood as being within the scope of the present invention as defined by the appended claims.

What is claimed is:
1. An ejector cycle comprising:
a compressor for compressing refrigerant;
a high-pressure heat exchanger for radiating heat of high-pressure refrigerant discharged from the compressor;

a low-pressure heat exchanger for evaporating low-pressure refrigerant after being decompressed;

an ejector including a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of the refrigerant while mixing refrigerant injected from the nozzle and refrigerant sucked from the low-pressure heat exchanger; and a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the low-pressure heat exchanger; and a variable throttle disposed in a refrigerant passage between the high-pressure heat exchanger and the ejector, wherein the variable throttle has a throttle opening degree that is variable such that a refrigerant super-heating degree at a refrigerant outlet side of the low-pressure heat exchanger becomes in a predetermined range; wherein the variable throttle is disposed to decompress high-pressure refrigerant from the high-pressure heat exchanger, to a gas-liquid two-phase mixture; and the nozzle of the ejector further decompresses the gas-liquid two-phase mixture in iso-enthalpy.

2. The ejector cycle according to claim 1, wherein, the variable throttle is a mechanical expansion valve having a sensing portion for sensing the refrigerant super-heating degree at the refrigerant outlet side of the low-pressure heat exchanger, and the variable throttle mechanically operates based on the refrigerant super-heating degree sensed by the sensing portion.

3. The ejector cycle according to claim 1, further comprising a sensor for detecting the refrigerant super-heating degree at the refrigerant outlet side of the low-pressure heat exchanger, wherein the variable throttle is an electrical throttle that is electrically operated based on the refrigerant super-heating degree detected by the sensor.

4. The ejector cycle according to claim 1, wherein at least a part of the variable throttle is integrated with the ejector.

5. The ejector cycle according to claim 1, wherein the nozzle decompresses refrigerant after being decompressed in the variable throttle.

6. An ejector cycle comprising:

a compressor for compressing refrigerant;

a high-pressure heat exchanger for radiating heat of high-pressure refrigerant discharged from the compressor a low-pressure heat exchanger for evaporating low-pressure refrigerant after being decompressed;

an ejector including a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant injected from the nozzle and refrigerant sucked from the low-pressure heat exchanger; and a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the low-pressure heat exchanger; and a variable throttle disposed in a refrigerant passage between the high-pressure heat exchanger and the ejector, wherein the variable throttle has a throttle opening degree that is variable such that a refrigerant super-heating degree at the refrigerant suction side of the compressor becomes a predetermined range; wherein the variable throttle is disposed to decompress high-pressure refrigerant from the high-pressure heat exchanger, to a gas-liquid two-phase mixture; and the nozzle of the ejector further decompresses the gas-liquid two-phase mixture in iso-enthalpy.

7. The ejector cycle according to claim 6, wherein, the variable throttle is a mechanical expansion valve having a sensing portion for sensing the refrigerant super-heating degree at the refrigerant suction side of the compressor; and the variable throttle mechanically operates based on the refrigerant super-heating degree sensed by the sensing portion.

8. The ejector cycle according to claim 6, further comprising:

a sensor for detecting the refrigerant super-heating degree at the refrigerant suction side of the compressor, wherein the variable throttle is an electrical throttle that is electrically operated based on the refrigerant super-heating degree detected by the sensor.

9. The ejector cycle according to claim 6, wherein at least a part of the variable throttle is integrated with the ejector.

10. The ejector cycle according to claim 6, wherein the nozzle decompresses refrigerant after being decompressed in the variable throttle.

11. The ejector cycle according to claim 1, wherein the variable throttle is disposed upstream side of the nozzle in a manner that a center axis of the variable throttle is coaxial with a center axis of the nozzle.

12. The ejector cycle according to claim 11, wherein the variable throttle is provided in a valve body that defines an upstream side refrigerant passage at an upstream side of the variable throttle and a downstream side refrigerant passage at a downstream side of the variable throttle;

the nozzle directly receives the refrigerant from the downstream side refrigerant passage; and a refrigerant passage from the upstream side refrigerant passage to an outlet of the nozzle is narrowed at the variable throttle, is expanded between the variable throttle and the nozzle, then, is narrowed at the nozzle and is expanded after the nozzle.

13. The ejector cycle according to claim 12, wherein the downstream side refrigerant passage is formed to boil the refrigerant at an inlet side of the nozzle, and the nozzle is formed to further boil the refrigerant.

14. The ejector cycle according to claim 12, wherein the downstream side refrigerant passage is formed to generate bubbles in the refrigerant and generate boiling cores at the inlet side of the throttle, and the nozzle is formed to further boil the refrigerant with the boiling cores.

15. The ejector cycle according to claim 6, wherein the variable throttle is disposed upstream side of the nozzle in a manner that a center axis of the variable throttle is coaxial with a center axis of the nozzle.

16. The ejector cycle according to claim 15, wherein the variable throttle is provided in a valve body that defines an upstream side refrigerant passage at an upstream side of the variable throttle and a downstream side refrigerant passage at a downstream side of the variable throttle;

the nozzle directly receives the refrigerant from the downstream side refrigerant passage; and a refrigerant passage from the upstream side refrigerant passage to an outlet of the nozzle is narrowed at the variable throttle, is expanded between the variable throttle and the nozzle, then, is narrowed at the nozzle and is expanded after the nozzle.

17. The ejector cycle according to claim 16, wherein the downstream side refrigerant passage is formed to boil the refrigerant at an inlet side of the nozzle, and the nozzle is formed to further boil the refrigerant.

18. The ejector cycle according to claim 16, wherein the downstream side refrigerant passage is formed to generate bubbles in the refrigerant and generate boiling cores at the inlet side of the throttle, and the nozzle is formed to further boil the refrigerant with the boiling cores.

19. An ejector cycle comprising:

a compressor for compressing refrigerant;

a high-pressure heat exchanger for radiating heat of high-pressure refrigerant discharged from the compressor;

a low-pressure heat exchanger for evaporating low-pressure refrigerant after being decompressed;

an ejector including a fixed nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant injected from the nozzle and refrigerant sucked from the low-pressure heat exchanger; and a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the low-pressure heat exchanger; and a variable throttle disposed upstream of said fixed nozzle in a refrigerant passage between the high-pressure heat exchanger and the ejector, wherein the variable throttle has a throttle opening degree that is variable such that a refrigerant super-heating degree at a refrigerant outlet side of the low-pressure heat exchanger becomes in a predetermined range.

20. An ejector cycle comprising:

a compressor for compressing refrigerant;

a high-pressure heat exchanger for radiating heat of high-pressure refrigerant discharged from the compressor;

a low-pressure heat exchanger for evaporating low-pressure refrigerant after being decompressed;

an ejector including a fixed nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed injected from the nozzle and refrigerant sucked from the low-pressure heat exchanger; and a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the low-pressure heat exchanger; and a variable throttle disposed upstream of said fixed nozzle in a refrigerant passage between the high-pressure heat exchanger and the ejector, wherein the variable throttle has a throttle opening degree that is variable such that a refrigerant super-heating degree at the refrigerant suction side of the compressor becomes in a predetermined range.

* * * * *